(12) United States Patent
Dickson

(10) Patent No.: US 8,602,699 B1
(45) Date of Patent: Dec. 10, 2013

(54) AUTOMATIC LOCKING SYSTEM FOR LOCKING A MOVABLE DEVICE TO TRANSPORT DEVICE OR NON-MOVABLE BED

(76) Inventor: Alan G. Dickson, Waldron, MI (US)

( * ) Notice: Subject to any disclaimer, the term of this patent is extended or adjusted under 35 U.S.C. 154(b) by 0 days.

(21) Appl. No.: 13/507,612

(22) Filed: Jul. 13, 2012

Related U.S. Application Data

(60) Provisional application No. 61/574,575, filed on Aug. 4, 2011, provisional application No. 61/687,710, filed on Apr. 30, 2012.

(51) Int. Cl.
*B60P 7/08* (2006.01)

(52) U.S. Cl.
USPC .................................. 410/7; 410/3

(58) Field of Classification Search
USPC ........... 410/2, 3, 4, 7, 80; 224/403, 404, 42.4, 224/553, 554, 567; 248/500, 503
See application file for complete search history.

(56) References Cited

U.S. PATENT DOCUMENTS 6,749,379 B1 * 6/2004 Feld et al. ........................ 410/22

* cited by examiner

*Primary Examiner* — Stephen Gordon
(74) *Attorney, Agent, or Firm* — Barbara M. Burns

(57) ABSTRACT

An automatic locking system for locking a movable device to a transport device or non-movable bed and for quickly and easily unlocking the movable device while preventing the locked in place device from moving and possibly becoming damaged having a trigger engaged by the movable device operating trigger to release a drop bar lowering inside a collar on the movable device locking the movable device and an angled piece keeps the movable device from rising. Locking brackets on upper and lower portions of device prevent unauthorized release of locking device and protect movable device from theft.

10 Claims, 4 Drawing Sheets

AUTOMATIC LOCKING SYSTEM FOR LOCKING A MOVABLE DEVICE TO TRANSPORT DEVICE OR NON-MOVABLE BED

REFERENCE TO RELATED APPLICATIONS

This application claims the benefit of provisional patent application Ser. No. 61/574,575, filed Aug. 4, 2011 and provisional patent application Ser. No. 61/687,710 filed Apr. 30, 2012.

BACKGROUND OF THE INVENTION

The field of the invention pertains to movable devices, such as line stripers, mowers, mulchers, chippers, trenchers, tillers, blowers, aerators, generators, air compressors, boats, planes, tractors, automobiles, motorcycles, ATVs, bicycles, jet skis, snowmobiles, etc., and, in particular, to an automatic locking system for securing such a movable device while transporting or storing the movable device.

Movable devices, such as line stripers, mowers, mulchers, chippers, trenchers, tillers, blowers, aerators, generators, air compressors, boats, planes, tractors, automobiles, motorcycles, ATVs, bicycles, jet skis, snowmobiles, etc. are machines that are generally taken to a site to be used.

For example, a line striper can be taken to a parking lot and at that location the line striper can be deployed for painting lines to indicate parking spaces; lawn equipment is taken to the site of the lawn; generators are taken to the site that needs power, etc.

A movable device, such as a line striper, mower, mulcher, chipper, trencher, tiller, aerator, generator, air compressor, boat, plane, tractor, automobile, motorcycle, ATV, bicycle, jet skis snowmobile, etc., can be positioned to a transit device, i.e., the bed of a truck or on a trailer or into a trailer for transporting to a site.

A problem is securing the movable device for transport. The movable device can bounce around during transit if the movable device is merely placed into the bed of a truck or into or on a trailer. Some attempts have been made to secure the movable device through the use of strapping and/or bungee cords. However, strapping and/or bungee cords must be placed carefully each time. Moreover, strapping and/or bungee cords can be susceptible to stretching and breaking allowing the movable device to come loose and move around during transit.

Another problem is that when the movable device is not completely secured from movement during transit, damage can occur to the moveable device on the trailer or bed of the truck or the movable device could possibly bounce off of an open truck bed.

Moreover, certain devices may have measurement accessories or fragile electronics that can be damaged by engagement with the walls of a trailer or a truck bed.

Another problem is that when a movable device is held in place on a trailer or a non-movable bed, the device can be removed illegally by an unauthorized person.

A need existed for a system to lock a movable device to a transport device or to a non-movable bed.

A need existed for a system device to quickly and easily lock the movable device to prevent damage to the movable device yet allow for quick release of the lock.

A need existed for a system to deter the unauthorized removal of a movable device from a transport device or from a non-movable bed.

SUMMARY OF THE INVENTION

The invention is an automatic locking system for securing a movable device to a transit device or non-movable bed. The automatic locking system having a generally vertical lower tube mountable to one of a transit device and a non-movable bed, the generally vertical lower tube having a plate mounted perpendicularly near the upper edge of the generally vertical lower tube, the plate having a portion of the plate extending in a right angle from the plate, an upper portion slidingly engageable with the generally vertical lower tube, a cross bar extending from the upper portion having at least two ends, at least two perpendicular arms attached to the cross bar, one of the at least two perpendicular arms extending from each end of the cross bar, each of the at least two perpendicular arms having a downwardly extending peg, a swing arm having a notch swingingly attached to the cross bar and a trigger, the notch of the swing arm resting on the plate of the generally vertical lower tube, whereby as a movable device engages the trigger, the trigger pushes the swing arm notch off the plate allowing the cross arm to lower the pegs near to or onto the movable device, preventing motion of the movable device until the cross arm is released upwardly. A handle can be added to the upper portion to aid unlocking or release of the automatic locking system by upward motion.

The locking is facilitated by a collar on the front of the device. The downwardly extending pegs on the perpendicular arms of the cross bar extend inside of and below the height of the collar and prevent the movable unit from moving. The front lower edge of the movable device is below the horizontal portion of the angle plate.

Movable devices not having a collar can have a collar retrofitted to the movable device or alternately, pegs of the system could fit into apertures in the movable device.

A brace can be added to the vertical lower tube to stabilize the system. A base plate can be affixed to the system to strengthen and secure the positioning of the system in the transit device or the non-movable bed.

BACKGROUND OF THE INVENTION

The field of the invention pertains to movable devices, such as line stripers, mowers, mulchers, chippers, trenchers, tillers, blowers, aerators, generators, air compressors, boats, planes, tractors, automobiles, motorcycles, ATVs, bicycles, jet skis, snowmobiles, etc., and, in particular, to an automatic locking system for securing such a movable device while transporting or storing the movable device.

Movable devices, such as line stripers, mowers, mulchers, chippers, trenchers, tillers, blowers, aerators, generators, air compressors, boats, planes, tractors, automobiles, motorcycles, ATVs, bicycles, jet skis, snowmobiles, etc. are machines that are generally taken to a site to be used.

For example, a line striper can be taken to a parking lot and at that location the line striper can be deployed for painting lines to indicate parking spaces; lawn equipment is taken to the site of the lawn; generators are taken to the site that needs power, etc.

A movable device, such as a line striper, mower, mulcher, chipper, trencher, tiller, aerator, generator, air compressor, boat, plane, tractor, automobile, motorcycle, ATV, bicycle, jet skis snowmobile, etc., can be positioned to a transit device, i.e., the bed of a truck or on a trailer or into a trailer for transporting to a site.

A problem is securing the movable device for transport. The movable device can bounce around during transit if the movable device is merely placed into the bed of a truck or into or on a trailer. Some attempts have been made to secure the movable device through the use of strapping and/or bungee cords. However, strapping and/or bungee cords must be placed carefully each time. Moreover, strapping and/or bungee cords can be susceptible to stretching and breaking allowing the movable device to come loose and move around during transit.

Another problem is that when the movable device is not completely secured from movement during transit, damage can occur to the moveable device on the trailer or bed of the truck or the movable device could possibly bounce off of an open truck bed.

Moreover, certain devices may have measurement accessories or fragile electronics that can be damaged by engagement with the walls of a trailer or a truck bed.

Another problem is that when a movable device is held in place on a trailer or a non-movable bed, the device can be removed illegally by an unauthorized person.

A need existed for a system to lock a movable device to a transport device or to a non-movable bed.

A need existed for a system device to quickly and easily lock the movable device to prevent damage to the movable device yet allow for quick release of the lock.

A need existed for a system to deter the unauthorized removal of a movable device from a transport device or from a non-movable bed.

SUMMARY OF THE INVENTION

The invention is an automatic locking system for securing a movable device to a transit device or non-movable bed. The automatic locking system having a generally vertical lower tube mountable to one of a transit device and a non-movable bed, the generally vertical lower tube having a plate mounted perpendicularly near the upper edge of the generally vertical lower tube, the plate having a portion of the plate extending in a right angle from the plate, an upper portion slidingly engageable with the generally vertical lower tube, a cross bar extending from the upper portion having at least two ends, at least two perpendicular arms attached to the cross bar, one of the at least two perpendicular arms extending from each end of the cross bar, each of the at least two perpendicular arms having a downwardly extending peg, a swing arm having a notch swingingly attached to the cross bar and a trigger, the notch of the swing arm resting on the plate of the generally vertical lower tube, whereby as a movable device engages the trigger, the trigger pushes the swing arm notch off the plate allowing the cross arm to lower the pegs near to or onto the movable device, preventing motion of the movable device until the cross arm is released upwardly. A handle can be added to the upper portion to aid unlocking or release of the automatic locking system by upward motion.

The locking is facilitated by a collar on the front of the device. The downwardly extending pegs on the perpendicular arms of the cross bar extend inside of and below the height of the collar and prevent the movable unit from moving. The front lower edge of the movable device is below the horizontal portion of the angle plate.

Movable devices not having a collar can have a collar retrofitted to the movable device or alternately, pegs of the system could fit into apertures in the movable device.

A brace can be added to the vertical lower tube to stabilize the system. A base plate can be affixed to the system to strengthen and secure the positioning of the system in the transit device or the non-movable bed.

Locking brackets of the upper and the lower tube when utilized with a padlock can prevent the device from releasing thus limiting possible theft or mischief involving the movable device.

For a more complete understanding of the present invention, reference is made to the following detailed description when read with in conjunction with the accompanying drawings wherein like reference characters refer to like elements throughout the several views, in which:

DESCRIPTION OF THE PREFERRED EMBODIMENT

Figure 1:
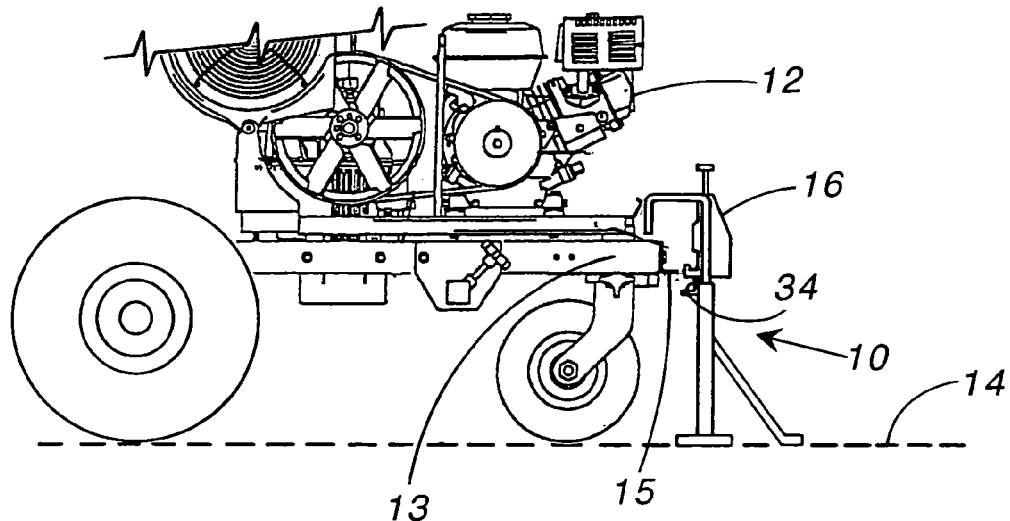
FIG. 1 illustrates a side view of the new automatic locking system with the system in the unlocked position with a movable unit near to the automatic locking system.
Figure 2:
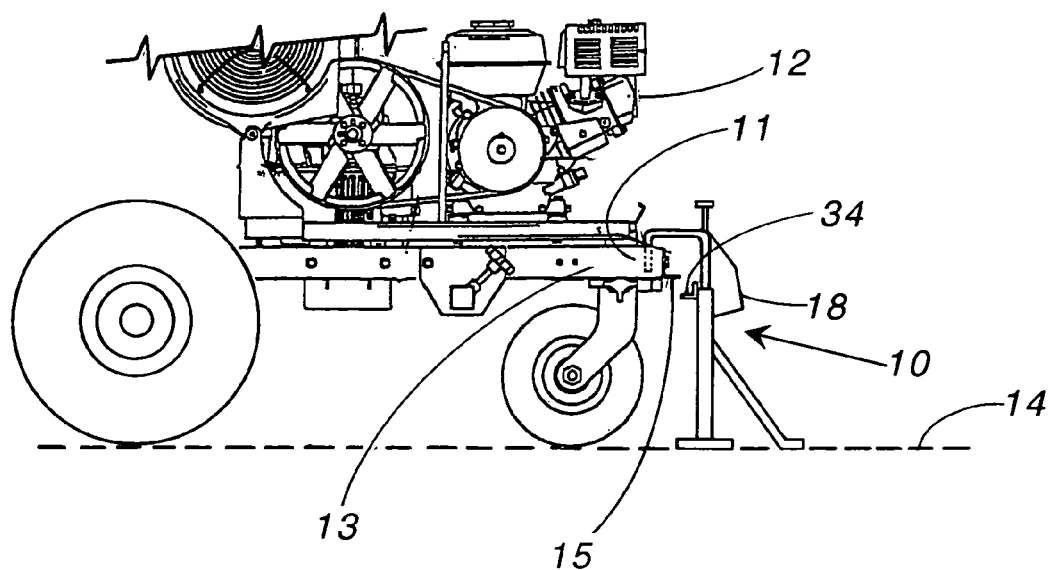
FIG. 2 illustrates a side view of the new automatic locking system with the system in the locked position with a movable unit locked by the automatic locking system.

Illustrated in FIGS. 1 and 2, new automatic locking system 10 for locking a movable device 12 to floor 14 is thereshown. Movable device 12 has protruding front lower edge 15. FIG. 1 depicts automatic locking system 10 in unlocked position 16 with movable device 12 near to automatic locking system 10. FIG. 2 depicts automatic locking system 10 in locked position 18 with movable device 12 locked by automatic locking system 10. Automatic locking system 10 is shown in hidden lines 11 behind collar 13.

Figure 3A:
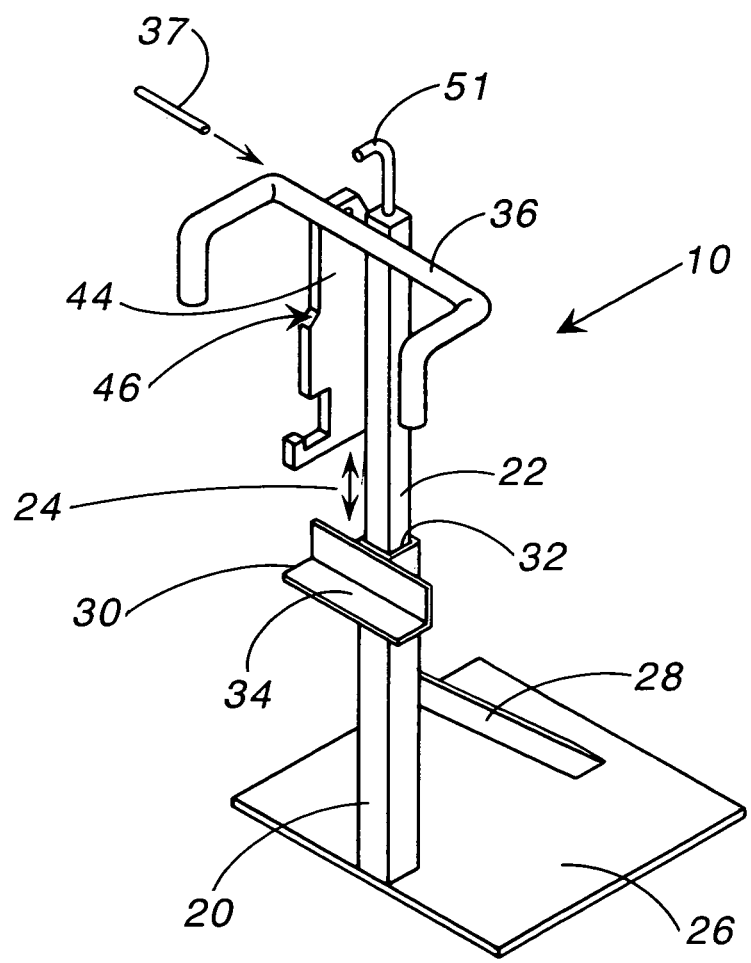
FIG. 3A illustrates a perspective view of the new automatic locking system.

Now turning to FIG. 3A, automatic locking system 10 is thereshown. Automatic locking system 10 comprises generally vertical lower tube 20 with upper portion 22 slidingly engageable along axis 24 with generally vertical lower tube 20. Generally vertical lower tube 20 can have base plate 26 affixed at the bottom for securement to floor 14. Brace 28 can be added to generally vertical lower tube 20.

Figure 3B:
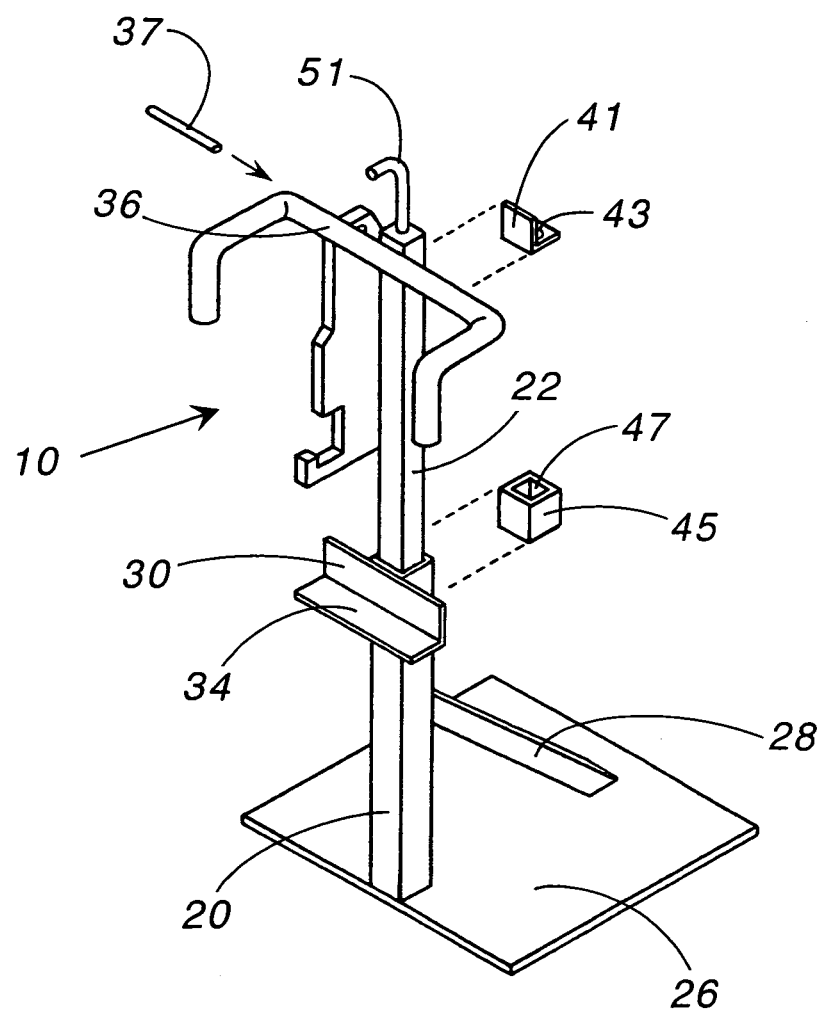
FIG. 3B illustrates a perspective view of the new automatic locking system with exploded parts of the lockable brackets.
Figure 4A:
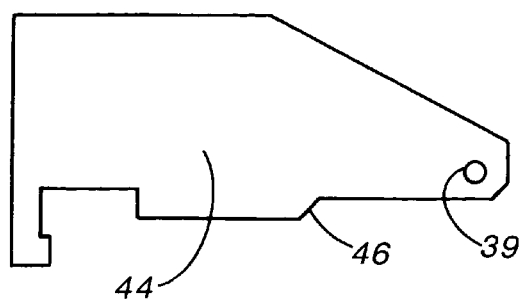
FIG. 4A illustrates the trigger.
Figure 4B:
FIG. 4B illustrates a side view of the trigger.
Figure 4C:
FIG. 4C illustrates the top view of the trigger.
Figure 4D:
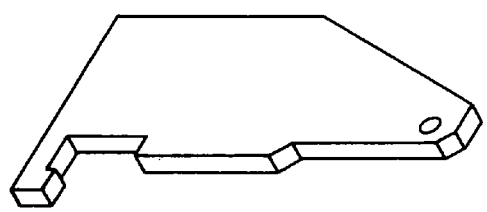
FIG. 4D illustrates a perspective view of the trigger.

Now turning to FIG. 3B, automatic locking system 10 is thereshown. Automatic locking system 10 comprises generally vertical lower tube 20 with upper portion 22 slidingly engageable along axis 24 with generally vertical lower tube 20. Generally vertical lower tube 20 can have base plate 26 affixed at the bottom for securement to floor 14 (FIGS. 1 and 2.) Brace 28 can be added to generally vertical lower tube 20.

Plate 30 is mounted perpendicularly on generally vertical lower tube 20 near the upper edge 32 of generally vertical lower tube 20. Plate 30 has portion 34 extending at right angle from plate 30.

Drop bar 36 extends from upper portion 22. Drop bar 36 having at least two arms 40, 40'. Perpendicular ends 42, 42' extend downwardly from arms 40, 40' of drop bar 36.

Trigger 44 having trigger notch 46 is swingingly attached to drop bar 36 with pin 37 through aperture 39 in trigger 44 (FIGS. 4A-4D). In unlocked position notch 46 rests on plate 30 (not shown in this view) to hold up cross bar 36. As movable device 12 engages trigger 44 pushing trigger notch 46 off plate 30 allowing drop bar 36 to drop lowering perpendicular ends 42, 42' locking movable device 12. Protruding front lower edge 15 of movable device 12 is below the horizontal portion 34 of angle plate 30 (as seen in FIGS. 1 and 2).

Movable device 12 is prevented from moving until drop arm 36 is released upwardly. Right angle portion 34 of plate 30 keeps locked movable device from rising. Handle 51 can be used to lift drop bar 36 releasing movable device 12.

Upper locking bracket 41 on upper portion 22 approaches lower locking bracket 45 on lower vertical lower tube 20. Padlock (not shown) can be inserted through aperture 43 on upper locking bracket 41 and through aperture 47 of lower locking bracket 45 to prevent unauthorized release operation of automatic locking system 10. Locking of upper locking bracket 41 with lower locking bracket 45 prevents theft of mobile device 10.

Locking is facilitated by collar 13 on mobile device 12. Downwardly extending perpendicular ends 42, 42' from perpendicular arms 40, 40' of drop bar 36 extend below height of collar 13 and control movable device 12 movement.

Brace 28 can be added to vertical lower tube 20. Base plate 26 can be affixed to system 10.

Figure 5A:
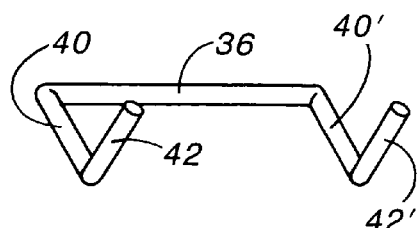
FIG. 5A illustrates a perspective of the drop bar.

FIG. 5A illustrates a perspective of drop bar 36 with two perpendicular arms 40, 40' and two extending arms 42, 42'.

Figure 5B:
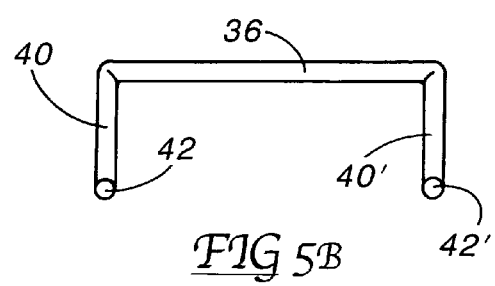
FIG. 5B illustrates a top view of the drop bar.
Figure 5C:
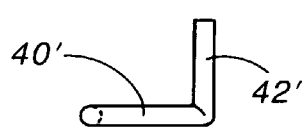
FIG. 5C illustrates a side view of the drop bar.
Figure 5D:
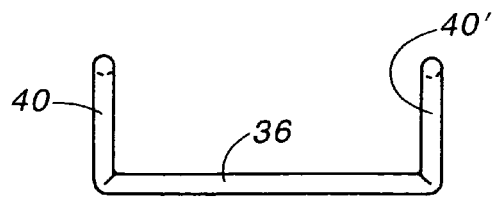
FIG. 5D illustrates a bottom view of the drop bar.

FIG. 5B illustrates a top view of drop bar 36 of FIG. 5A showing two perpendicular arms 40, 40' while FIG. 5C illustrates a left side view of drop bar 36. FIG. 5D illustrates a bottom view of drop bar 36.

Having described the invention, many modifications thereto will become apparent to those skilled in the art to which it pertains without deviation from the spirit of the invention as defined in the appended claim.

The invention claimed is:

1. An automatic locking system for securing a movable device to a transit device or non-movable bed comprising:
   a generally vertical lower tube mountable to one of a transit device and a non-movable bed, the generally vertical lower tube having a plate mounted perpendicularly near an upper edge of the generally vertical lower tube, the plate having a portion of the plate extending in a right angle from the plate;
   an upper portion slidingly engageable with the generally vertical lower tube;
   a drop bar extending from the upper portion, said drop bar having at least two ends;
   at least two perpendicular arms extending from the drop bar, an arm extending downwardly from each of the at least two perpendicular arms; and
   a trigger having a trigger notch, the trigger swingingly attached to the drop bar, the notch of the trigger resting on the plate of the generally vertical lower tube,
   whereby as a movable device engages the trigger, the trigger pushes the notch off the plate allowing the drop bar to lower the downwardly extending arms to one of near to and against the movable device and the portion of the plate retains the movable device from rising.

2. An automatic locking system for securing a movable device to a transit device or non-movable bed according to claim 1 further comprising:
   a locking bracket attached to the upper portion slidingly engageable with the generally vertical lower tube; and
   a locking bracket attached to the generally vertical lower tube, wherein the locking bracket attached to the upper portion slides near to the locking bracket attached to the generally vertical lower bracket as the upper portion slidably engages the generally vertical lower tube.

3. An automatic locking system for securing a movable device to a transit device or non-movable bed according to claim 1 further comprising:
   an aperture through the trigger; and
   a pin deployed through the aperture of the trigger.

4. An automatic locking system for securing a movable device to a transit device or non-movable bed according to claim 2 further comprising:
   a lock to engage the upper portion bracket to the lower tube bracket for preventing unauthorized release of locking system.

5. An automatic locking system for securing a movable device to a transit device or non-movable bed according to claim 1 further comprising:
   a protruding front on the movable device,
   whereby as the movable device engages the trigger, the trigger pushes the notch off the plate allowing the drop bar to lower the downwardly extending arms against the movable device,
   preventing motion of the movable device until the drop bar is released upwardly.

6. An automatic locking system for securing a movable device to a transit device or non-movable bed according to claim 1 further comprising:
   a collar on a front of the movable device, whereby the downwardly extending arms on the perpendicular arms of the drop bar extend inside of and below a height of the collar and prevent the movable device from moving.

7. An automatic locking system for securing a movable device to a transit device or non-movable bed according to claim 1 further comprising:
   a base plate connecting the generally vertical lower tube for mounting to one of a transit device and a non-movable bed.

8. An automatic locking system for securing a movable device to a transit device or non-movable bed according to claim 1 further comprising:
   a support member bracing the vertical lower tube.

9. An automatic locking system for securing a movable device to a transit device or non-movable bed according to claim 1 further comprising:
   a U-shaped lock to lock a movable device in position under the automatic locking system.

10. An automatic locking system for securing a movable device to a transit device or non-movable bed according to claim 1 further comprising:
    a handle extending from the upper portion to aid one of unlocking and release of the automatic locking system by upward motion.

* * * * *